(12) United States Patent
Wright et al.

(10) Patent No.: US 9,366,364 B2
(45) Date of Patent: *Jun. 14, 2016

(54) CONNECTION BETWEEN A WALL AND A PIPE

(75) Inventors: Wayne Clifton Augustus Wright, Maidstone (GB); John Alexandre Boudry, Brettenham (GB)

(73) Assignee: Franklin Fueling Systems Limited, London (GB)

( * ) Notice: Subject to any disclaimer, the term of this patent is extended or adjusted under 35 U.S.C. 154(b) by 1404 days.

This patent is subject to a terminal disclaimer.

(21) Appl. No.: 12/428,928

(22) Filed: Apr. 23, 2009

(65) Prior Publication Data

US 2009/0246053 A1    Oct. 1, 2009

Related U.S. Application Data

(63) Continuation of application No. 10/823,195, filed on Apr. 12, 2004, now Pat. No. 7,523,962, which is a continuation of application No. 09/581,378, filed as application No. PCT/GB98/03698 on Oct. 12, 1998, now abandoned.

(30) Foreign Application Priority Data

Dec. 10, 1997    (GB) .................................. 9726154.9

(51) Int. Cl.
*F04B 39/00* (2006.01)
*F16L 5/02* (2006.01)

(52) U.S. Cl.
CPC ....................................... *F16L 5/02* (2013.01)

(58) Field of Classification Search
CPC ........................................................ F16L 5/02
USPC ............................ 285/21.2, 123.15, 189, 205
See application file for complete search history.

(56) References Cited

U.S. PATENT DOCUMENTS

| | | | |
|---|---|---|---|
| 2,141,260 A | | 12/1938 | Caughey |
| 3,420,303 A | * | 1/1969 | Stearns ........................ 166/85.2 |
| 3,423,518 A | * | 1/1969 | Weagant .................... 174/153 G |
| 3,550,579 A | * | 12/1970 | Baker ........................ 126/307 R |
| 4,089,139 A | | 5/1978 | Moffa et al. |
| 4,200,299 A | * | 4/1980 | Carlesimo ..................... 277/606 |

(Continued)

FOREIGN PATENT DOCUMENTS

| | | |
|---|---|---|
| DE | 195 08 188 | 9/1996 |
| EP | 0 190 810 | 8/1986 |

(Continued)

OTHER PUBLICATIONS

Friafit—Sewage Saddle Top-Loading ASA-TL, Friafit Data Sheet No. 1/99, Updated Jul. 2003.

(Continued)

*Primary Examiner* — Xuan Lan Nguyen
(74) *Attorney, Agent, or Firm* — Faegre Baker Daniels LLP

(57) ABSTRACT

A fitting for providing a substantially fluid-tight seal between an opening in a chamber wall and a pipe passing through the opening, the fitting including a tubular sleeve adapted to allow the pipe to pass through the sleeve, a flange extending radially outwardly from the sleeve, the fitting incorporating an energy transfer device enabling heating to cause the fitting and the wall to fuse or bond together in order to form a substantially fluid-tight seal.

37 Claims, 9 Drawing Sheets

(56) References Cited

U.S. PATENT DOCUMENTS

| | | | |
|---|---|---|---|
| 4,894,521 A * | 1/1990 | Evans | 219/535 |
| 4,928,349 A * | 5/1990 | Oikawa et al. | 174/153 G |
| 5,141,260 A * | 8/1992 | Burwell | 285/123.17 |
| 5,211,428 A | 5/1993 | Emerson et al. | |
| 5,254,824 A * | 10/1993 | Chamberlain et al. | 219/759 |
| 5,286,040 A * | 2/1994 | Gavin | 277/606 |
| 5,295,760 A * | 3/1994 | Rowe | 405/52 |
| 5,538,035 A | 7/1996 | Gavin | |
| 5,601,315 A | 2/1997 | Bunger et al. | |
| 5,655,564 A * | 8/1997 | Gavin | 137/363 |
| 5,704,656 A * | 1/1998 | Rowe | 285/93 |
| 6,089,615 A * | 7/2000 | Jappinen | 285/21.2 |
| 7,523,962 B2 * | 4/2009 | Wright et al. | 285/21.2 |

FOREIGN PATENT DOCUMENTS

| | | |
|---|---|---|
| GB | 6 12 511 | 11/1948 |
| GB | 21 71 855 | 9/1986 |

OTHER PUBLICATIONS

International Preliminary Report on Patentability dated Mar. 15, 2000 in International Application No. PCT/GB98/03698.

Written Opinion and International Search Report mailed Aug. 27, 1999 in International Application No. PCT/GB98/03698.

* cited by examiner

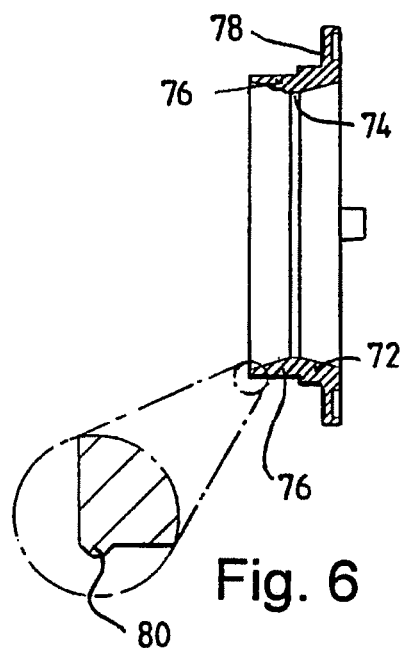
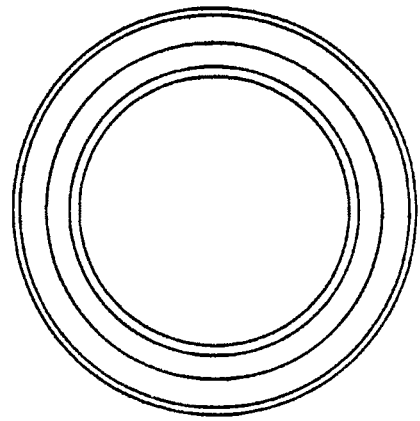
Fig. 6
Fig. 7
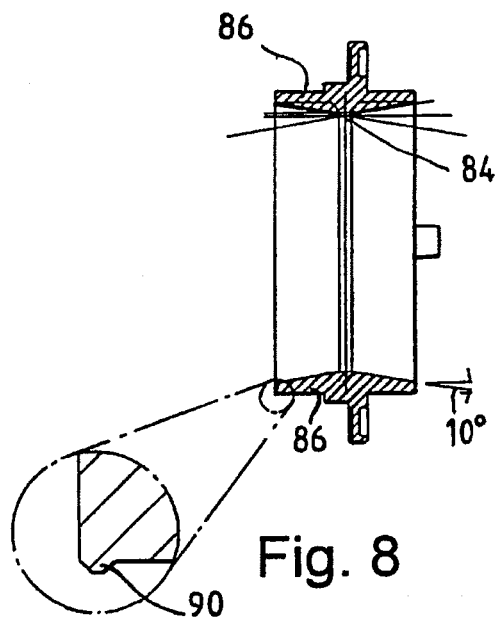
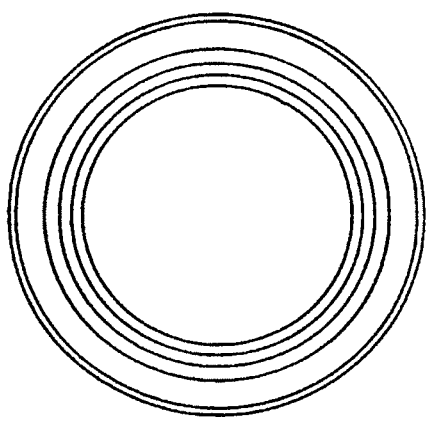
Fig. 8
Fig. 9

| Option 1 | Option 2 | Option 3 |
|---|---|---|
| Weld on outside of chamber | Weld on either side of chamber | Electro - Fusion Socket on outside |

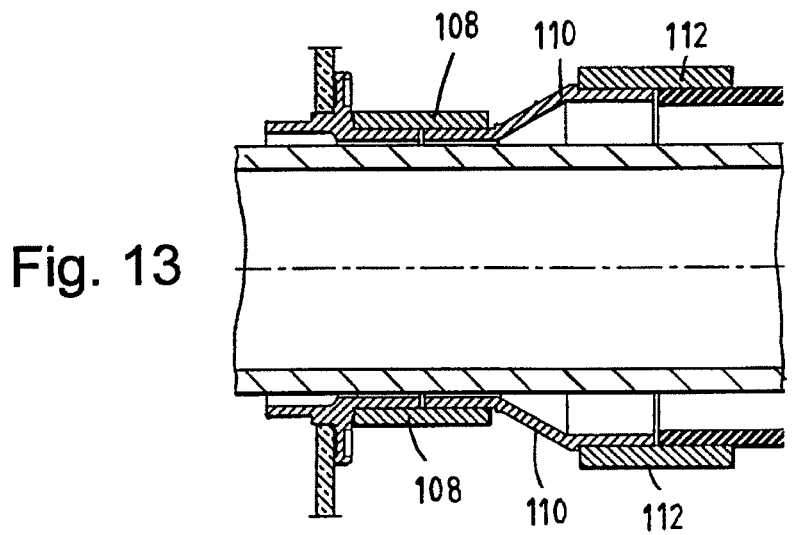
Secondary Containment Chamber
Connection of 160/110 and 160/90 Pipe
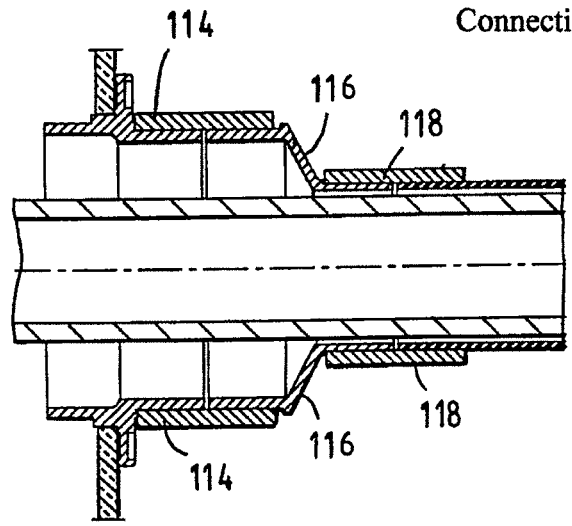
Secondary Containment Chamber
Connection of 75/63 Pipe
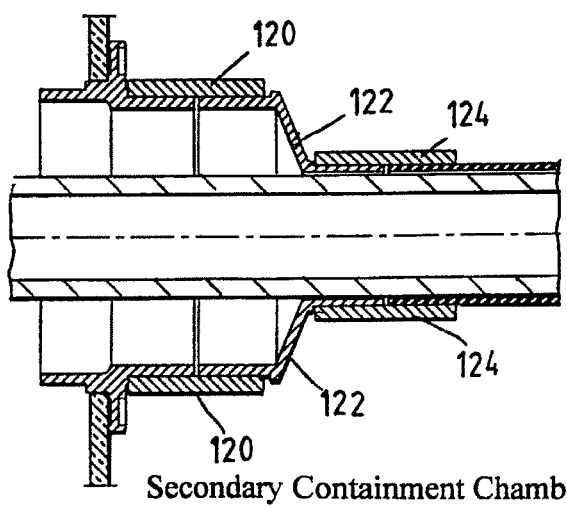
Secondary Containment Chamber
Connection of 63/54 Pipe

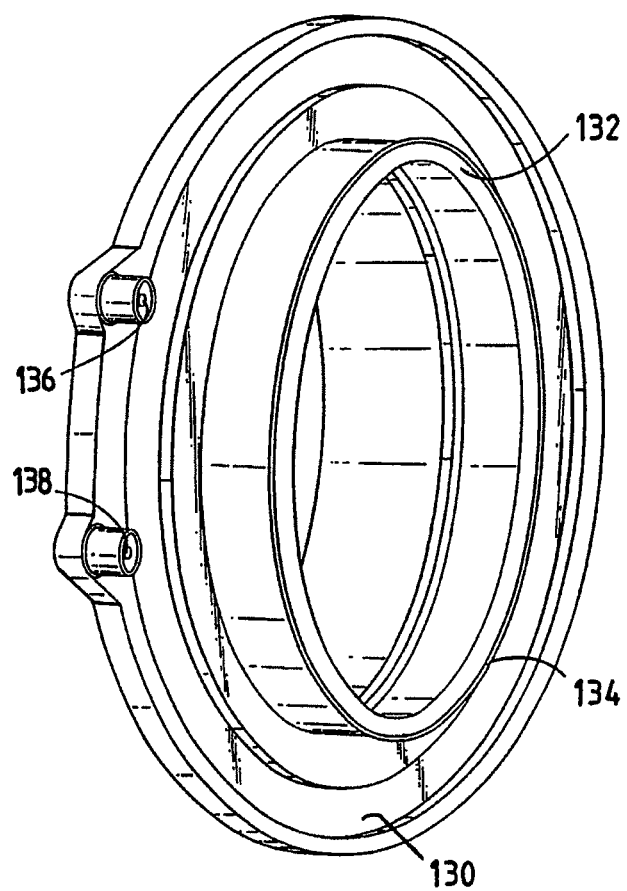
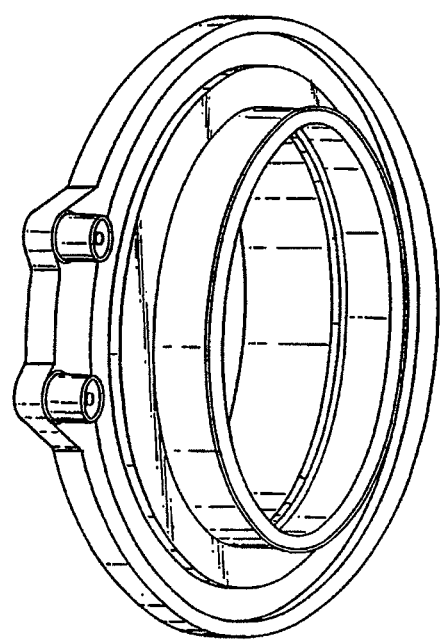
Fig. 23
Fig. 24

CONNECTION BETWEEN A WALL AND A PIPE

CROSS-REFERENCE TO RELATED APPLICATIONS

This application is a continuation of application Ser. No. 10/823,195 filed on Apr. 12, 2004, which is a continuation of application Ser. No. 09/581,378 filed on Jul. 27, 2000.

FIELD OF THE INVENTION

This invention relates to fittings for providing a seal between a wall and a pipe passing through an opening in the wall, to a method of providing such a seal, and to an assembly comprising the combination of a pipe, a wall and a fitting providing a seal between the two. The invention is particularly applicable to the provision of a seal between a pipe and a wall of a manhole chamber as found in a subterranean fuel tank or sump for a dispensing pump, for example in a petroleum forecourt installation.

BACKGROUND TO THE INVENTION

In petroleum forecourt installations, pipework running between dispensing pumps and a subterranean fuel storage tank passes into a manhole chamber which is situated directly above the manhole lid of the tank. The chamber is normally defined by an upstanding wall which, when viewed from above, can be of an octagonal, square or rectangular shape, and which includes apertures through which respective pipes pass.

It is desirable to provide a seal between each of the apertures and its respective pipe to avoid ingress of water into the manhole chamber. To that end, it is known to attach a fitting to a portion of the wall around the aperture and a rubber "boot" that sleeves over the pipe and is clamped to both the pipe and the fitting by, for example, Jubilee™ clips. Some types of fitting are bolted to the chamber wall, whilst other types of fitting provide inner and outer parts between which the wall is sandwiched, the inner and outer parts being held together by a screw-threaded connector which extends through the aperture. These connectors often incorporate a rubber seal located between a part of the connector and the chamber wall.

An example of a prior art seal is described in U.S. Pat. No. 5,538,035. This illustrates a flanged fitting for a subterranean tank. The flanged fitting is attached to the side of the tank by ultrasonic welding or a chemical bonding agent. Whilst heat sealing is referred to as a method of attachment, if heating is used then it must be applied using an external source of heat.

Heat sealable connections are known per se. For example U.S. Pat. No. 5,601,315 describes a plastic molded connector for connecting a plastic branch pipe onto a plastic pipeline, comprising a saddle portion and a pipe socket portion. Both the saddle and pipe portions contain electric heating windings. However, the configuration of this coupling makes it entirely unsuitable for the present application.

Neither type of fitting provides a completely effective seal. Consequently, both types of seal can allow water to leak into the manhole chamber and to accumulate in a pool in the bottom of the chamber. This in turn makes the maintenance of the chamber bottom and tank entrance extremely difficult.

Furthermore, it has been found that the removal and replacement of the rubber seals of conventional arrangements can also be extremely difficult and expensive.

It is an object of the present invention to provide a fitting which overcomes some or all of the above disadvantages.

SUMMARY OF THE INVENTION

According to a first aspect of the present invention, there is provided a fitting for providing a substantially fluid-tight seal between an opening in a chamber wall and a pipe passing through said opening, said fitting comprising:—
 (i) a tubular sleeve adapted to pass through the opening in the chamber wall and further adapted to allow the pipe to pass through the sleeve;
 (ii) a flange, extending radially outwardly from the sleeve, a first surface of the flange being configured to contact the chamber wall around substantially the whole circumference of the opening;
characterized in that the flange incorporates an energy transfer means at or near the first surface, said energy transfer means enabling the first surface and/or the wall of the chamber in the vicinity of the flange to be heated to cause the flange and the wall to fuse or bond together in order to form a substantially fluid tight seal.

It is believed that water which leaks through conventional fittings and seals does not pass between the sealing member, for example the rubber gasket seal, and the pipe, but instead passes between the fitting and the wall. By contrast, the present invention provides a fitting which, when installed, is sealed to the wall around the aperture, and which does not require attachment to the wall by any invasive method, for example bolts, which would require further apertures in the wall. Thus, a seal formed using a fitting in accordance with the present invention should be substantially watertight or at least far more effective than the seals provided by conventional fittings.

Preferably, the first surface comprises a fusible material, such as a thermoplastic (for example polyethylene) which, when heated via the energy transfer means, at least partially melts, causing the fitting and the wall to be fused together.

Preferably, the energy transfer means comprises conduction means for conducting an electric current, said conduction means in use, being heated by the current, to cause said heating of the surface.

The process by which two components are fused together as a result of electrical heating from a conductor (situated at or near the interface between the two components prior to fusing) is known as electrofusion. Electrofusion is normally used to provide seals at the join between two lengths of pipe, (particularly polyethylene pipe) in a pipeline. The same process can be used by a fitting in accordance with the present invention if the wall to which the fitting is to be fused is of a suitable thermoplastic material, such as polyethylene.

It is however possible for the fitting to be required for a wall which is of a material, for example fibreglass, which is not suitable for being attached to the fitting by electrofusion. In this case, therefore, the first surface of the fitting preferably comprises an adhesive which is of a type which is activated by heat, wherein the heating of the surface by the energy transfer means activates the adhesive and thereby bonds the fitting to the wall. The adhesive can be a thermoplastic, thermoset, cross-linking or pressure sensitive adhesive of a type known per se.

This type of fitting can be attached to a wall by a procedure similar to that used by the fitting which is bonded to a wall by electrofusion.

Preferably, the conduction means comprises a heating wire which is conveniently embedded within the surface. The surface may to advantage be part of a flange which extends from the sleeve. Where the sleeve is of a substantially circularly symmetric cross-section, the flange is preferably radial.

If the energy transfer means comprises conduction means, the fitting preferably includes terminals, for connecting the conduction means to a current supply, which are accessible from the opposite side of the flange from the surface.

According to a second aspect of the invention, there is provided a fitting in accordance with the first aspect of the invention and a sealing member for sealing the sleeve of the fitting to a pipe passing therethrough. The sealing member may be incorporated into the sleeve, or may be formed as an initially separate fitting which is subsequently attached to the sleeve after the fitting has been installed.

Preferably, the sealing member is resilient, and there is provided clamping means (such as jubilee clips) for clamping the sealing member to the pipe and/or the sleeve. Conveniently, the sealing member comprises a rubber sleeve.

According to a third aspect of the invention, there is provided a method of providing a seal between a pipe and a wall having an opening through which the pipe passes, the method comprising the steps of applying a fitting to the pipe, the fitting having a sleeve through which the pipe passes and a surface which is placed against a portion of the wall around the opening so as to surround the latter; heating the surface and/or said portion of the wall thereby to cause the wall and the surface, and hence the fitting to become fused or bonded together, and sealing the sleeve to the pipe before, during or after said heating step.

Preferably, said heating is achieved by passing an electric current through conduction means in the vicinity of the portion of the wall and the surface. The conduction means may be provided on the wall, but is preferably carried by the surface of the fitting.

Conveniently, the materials constituting the wall and the surface are such that the surfaces are fused together by a process of electrofusion.

Where other materials are used, however, the method also includes providing an adhesive which is activated by said energy transfer to cause the fitting to be bonded to the wall. The adhesive may form the surface of the fitting. Additionally or alternatively, the adhesive may be provided on the wall of the chamber.

Preferably, the wall comprises a manhole chamber wall for a subterranean fuel tank.

The invention also lies in a manhole chamber for a subterranean fuel tank, a pipe which passes through an aperture in the wall of the chamber, a fitting having a sleeve through which the pipe passes, the fitting being placed against the wall so as to surround the aperture, energy transfer means for heating the fitting and/or the chamber to cause the fitting and/or chamber to be fused or bonded together in a region which surrounds the aperture, and a sealing member for sealing the pipe to the sleeve.

BRIEF DESCRIPTION OF THE DRAWINGS

The invention will now be described, by way of example only, with reference to the accompanying drawings in which:

FIGS. 6, 7, 8 and 9 show sectional side views and end elevations of further embodiments;

FIGS. 10, 11, 12 and 13 show sectional side views of various fittings showing tolerances for pipes not aligned perpendicular to the chamber wall;

FIG. 12 shows a typical and elevation for such fittings;

FIGS. 13, 14 and 15 show fittings according to the present invention in use with conventional pipe electrofusion seals;

FIGS. 23 and 24 show perspective views of a preferred embodiment;

DEFINITIONS

In this context the following terms have the meanings given below in addition to their ordinary dictionary meanings:

chamber—any receptacle designed to keep a fluid in or out. This includes, but is not limited to manhole and sump chambers as described herein. It also includes tanks in general.

energy transfer means—a generic term describing any form of energy source. Typically it takes the form of a resistance winding which heats up when an electrical current is passed through it. The term also encompasses other welding techniques including ultrasonic welding and induction welding.

flange—any collar suitable for attaching a fitting to a chamber wall. In the examples given the surface of the flange which contacts the chamber wall is substantially planar. However, it will be understood that the flange must conform to the profile of the chamber wall around the pipe inlet opening. Thus the flange can adopt any suitable conformation to achieve the necessary contact with a flat or curved surface or even the corner of a container wall.

fluid—whilst the examples provided relate mainly to liquids, the term fluid refers to liquids, vapors and gases. For example, should a leak occur in a secondarily contained pipe in a garage forecourt installation then petrol or petrol vapor will collect in the manhole chamber. It is essential that this petrol vapor cannot escape through the wall of the chamber and into the surrounding ground.

pipe—the examples given herein are for a generally circular cross-sectioned single wall pipe. However, the invention also covers other cross-sections such as box sections, corrugated and the like and secondarily contained pipes of the "pipe-within-a-pipe" type. In this case the sealing member or boot for sealing the sleeve to the pipe will be rather more complex. However, such boots are well known in the art.

The invention also encompasses pipes which are not circular in cross-section.

tubular sleeve—this term has a very broad meaning. It includes any projection from the flange which substantially encircles a pipe passing through the fitting and which enables a seal to be made between the fitting and the pipe. The flange and sleeve need not be of unitary construction and the two-part threaded construction shown in FIG. 4 offers certain advantages.

DESCRIPTION OF THE PREFERRED EMBODIMENTS

The present embodiments represent currently the best ways known to the applicant of putting the invention into practice. But they are not the only ways in which this can be achieved. They are illustrated, and they will now be described, by way of example only.

Figure 1:
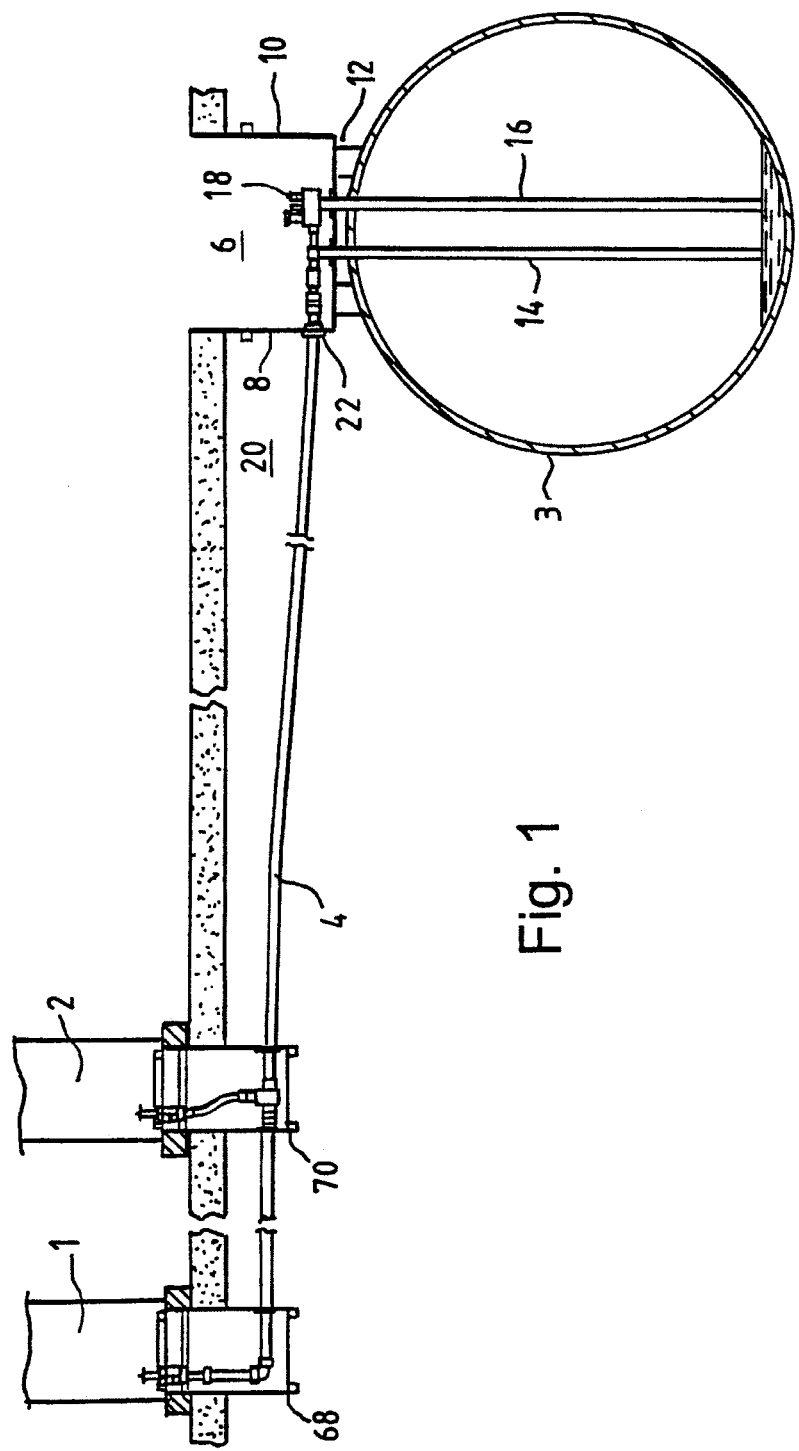
FIG. 1 is a partially cut-away side view of part of a petroleum forecourt installation which includes a tank having a manhole chamber, having a fitting in accordance with the invention.

The petroleum forecourt installation shown in FIG. 1 comprises a pair of dispensing pumps 1 and 2 connected to a subterranean tank 3 through a pipeline 4. The pipeline 4 is formed from contiguously arrange sections of polyethylene pipe. The pipeline 4 extends from the pumps 1 and 2 into a manhole chamber 6 immediately above the tank 3. The chamber 6 is defined by a polyethylene member 8 having a side wall 10 and a base 12.

FIG. 1 shows two lines extending from the pipeline 4 into the tank 3. These lines relate to two alternative forms of fuel supply system and are both shown for the sake of completeness. In practice, only one of the lines would extend from the pipeline 4 into the manhole chamber 6. One of those lines is a suction line 14 which is used where the dispensing pumps and 2 are fitted with suction pumps. The alternative line, reference 16, is a pressure line connected to the pipeline 4 via a pump 18 which is operable to propel fuel from the tank 3 to the pumps 1 and 2.

It can be seen from FIG. 1 that the wall 10 has to be apertured in order to allow the pipeline 4 to pass into the chamber 6. In order to prevent water leaking from the surrounding ground (here denoted by reference numeral 20) into the chamber 6 through the aperture, the pipe is sealed to the cylindrical wall 10 by means of a fitting 22 shown in more detail in FIGS. 2 to 5.

The fitting comprises a cylindrical sleeve 22 having an outwardly projecting radial flange 24 towards one end. The flange and sleeve define a central passage through which the pipe of the pipeline 4 extends. It can also be seen from FIG. 2 that the sleeve extends through the aperture in the wall 10 so that the sleeve is at least partially accommodated within the chamber 6, whilst the flange 24 is situated outside the chamber.

Figure 2:
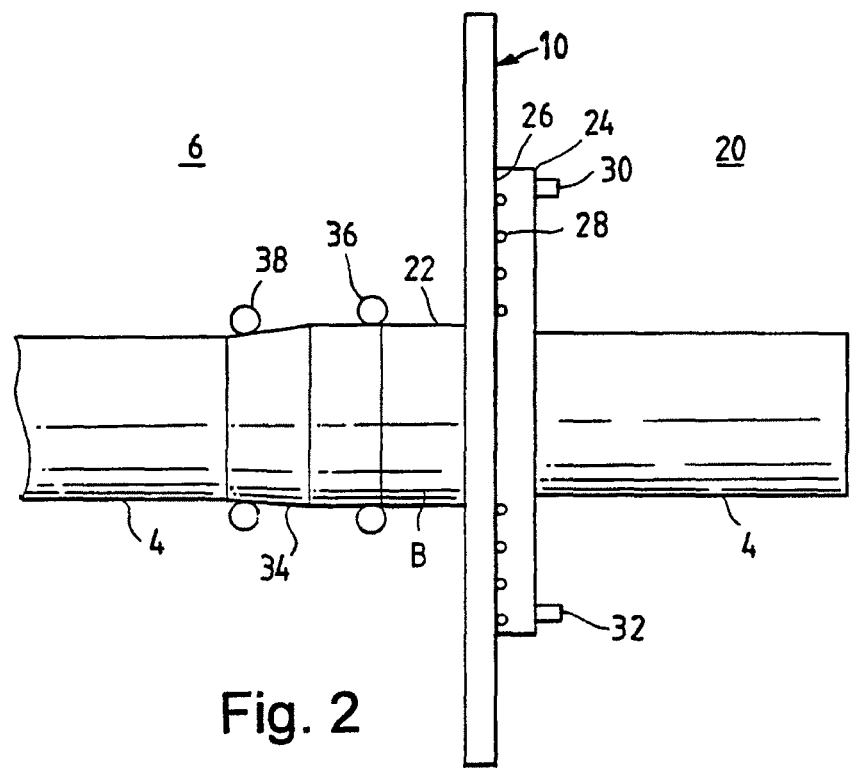
FIG. 2 is a cut-away side elevation, to an enlarged scale, showing the fitting in position on the manhole chamber wall.
Figure 3:
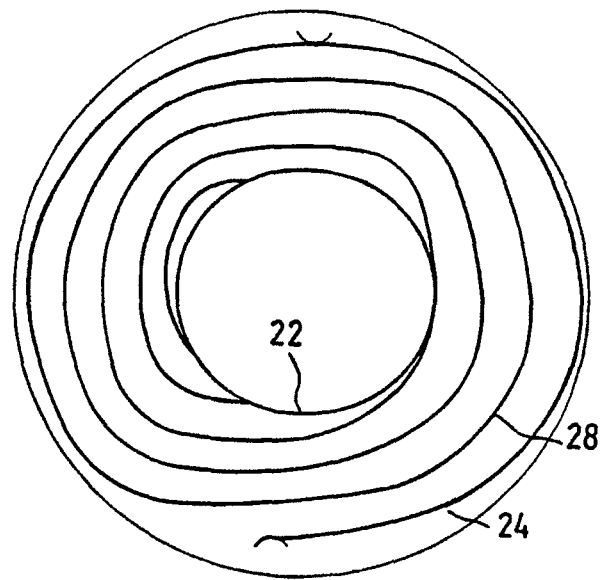
FIG. 3 is a front elevational view of the fitting (prior to installation)

The flange 24 has a surface 26 which is flat, to enable the surface to be placed against the wall 10 as shown in FIG. 2. Accordingly, the flange 24 makes contact with the wall 10 in a region which surrounds the opening through which the pipe 4 passes. A wire 28 is embedded in the surface 26 in a generally spiral shape as shown in FIG. 3, and the ends of the wire 28 are connected to electric terminals 30 and 32.

The sleeve 22 is also adapted to receive a rubber boot 34 which is clamped at one end over the sleeve by a jubilee clip 36. The opposite end of the boot 34 is clamped onto the pipe of the pipeline 4 by a jubilee clip 38.

When the fitting (constituted by the sleeve 22 and flange 24) is installed, the flange 24 is initially pressed against the wall 10 and the terminals 30 and 32 connected to a source of electric current. The current passes through the wire 28, causing the latter to heat the adjacent surface of the flange 24 (and part of the tank 10), to cause the flange 24 and wall 10 to fuse together in a disc-shaped region which surrounds the opening in the tank 10. This not only retains the fitting on the wall 10 but also provides a seal which encircles the opening in the tank, and thus prevents water passing between the flange and the wall 10 through the opening of the latter into the chamber 6. The passage of any water which travels along the surface of the part of the pipe outside the chamber 6 will be blocked by the boot seal 34.

If the chamber wall were to be made of fibreglass, a modified version of fitting would be used. The modified version is identical to the version shown in FIGS. 2 and 3, apart from the inclusion of a layer of adhesive over the surface of the flange which would constitute the surface 26 on the flange 24 and which overlies the heating wire. The adhesive is a thermoplastic or cross-linking adhesive which once heated, forms a bond between the flange 24 and the wall 10. Again, since the bond will surround the opening in the wall 10, it also acts as a liquid tight seal to prevent the ingress of water.

It will be appreciated that various modifications to the fitting and/or chamber wall are possible within the scope of the invention. Thus, for example, the wire 28 could be embedded in the chamber wall 10, and the latter could carry the adhesive coating instead of, or in addition to, the fitting 24.

Figure 4:
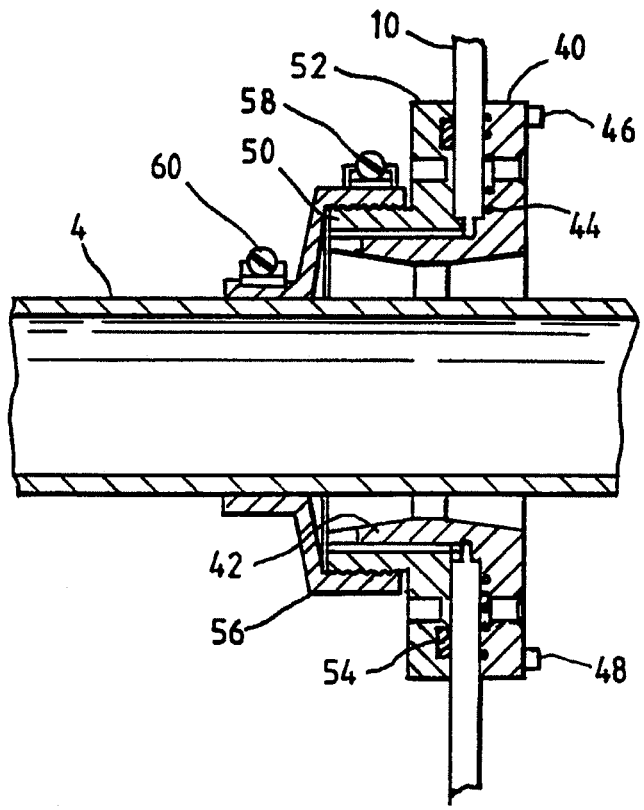
FIGS. 4 and 5 are sectional side views of two further embodiments of fittings in accordance with the invention, each drawing showing the fitting when installed.
Figure 5:
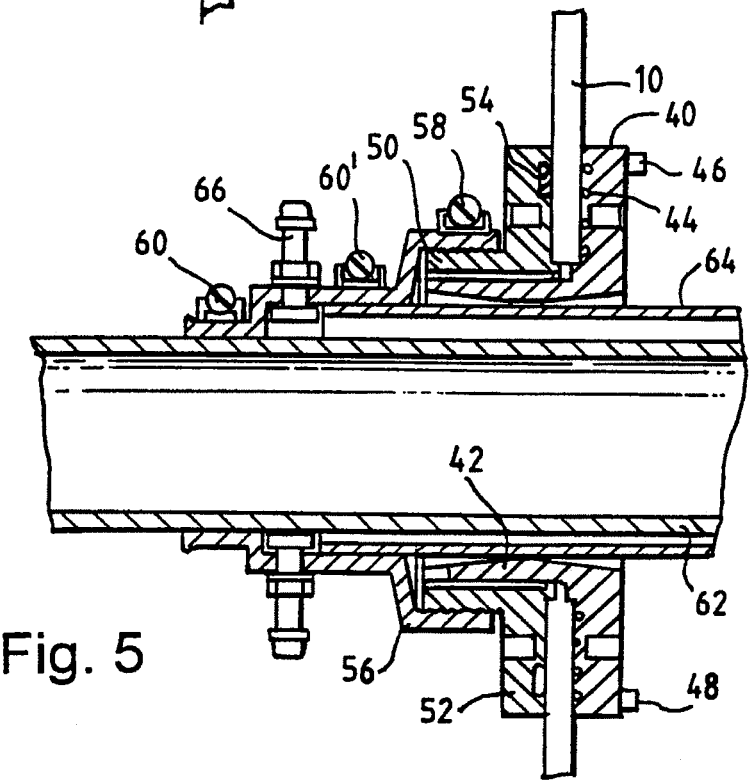

FIGS. 4 and 5 show alternative forms of fitting when installed on the chamber wall 10.

The fitting shown in FIG. 4 has an outer circular back plate 40 which is formed as a radial flange on a sleeve 42, and which carries a spiral winding of a wire 44 connectable to an electric current source by means of terminals 46 and 48.

The flange 40 and sleeve 42 are formed of a thermoplastics material which can be fused to the (thermoplastic) wall 10 in a similar fashion to the fitting shown in FIG. 2.

Alternatively, either the flange 40 or wall 10 can carry a heat-activated adhesive if the wall 10 is of a material not suitable for electrofusion welding.

The outer surface of the sleeve 42 carries a screw-threaded portion which enables the sleeve, and hence the flange, to be screwed onto an outer sleeve 50 from which a further radial flange 52 projects. The inner flange 52 is pressed against the inside of the wall 10, and includes a circular groove which accommodates an O-ring seal 54 for preventing the ingress of any water which manages to breach the seal between the flange 40 and outside of the wall 10.

The sleeve 50 carries a rubber boot 56, clamped to the sleeve by a jubilee clip 58. The boot is also clamped to the pipe of the pipeline 4 by a jubilee clip 60, and serves a similar purpose to that of the boot 34.

As the outside of the fitting (i.e. flange 40 and sleeve 42) is securely bonded/fused to the wall 10, the removal of the sleeve 50 (and flange 52) for repair or maintenance can be readily done without the need to have any access to the exterior of the wall 10.

FIG. 5 shows the same fitting when modified to accept a pipeline which uses secondary containment (in which fuel is conveyed along an inner fuel supply pipe 62 which extends through an outer, secondary pipe 64). It can be seen that the only modification to the fitting is to the boot seal, and associated jubilee clips which are now arranged to provide a seal between the fitting and both the pipes 64 and 62 (three jubilee clips 60, 60' and 58 are used to that end). It can be seen that the boot 56 is also configured to accommodate part of a leak detection sensor for detecting any leaks of fuel from the inner pipe 62 into the interstitial space between the pipes 62 and 64.

A similar arrangement of fittings to those shown in FIG. 2, 4 or 5 are used to seal the pipeline 4 to each of a pair of sumps 68 and 70 (which are rectangular in plan) beneath the pumps 1 and 2 respectively. A respective fitting is installed on the sumps 68 and 70 about each aperture (in the sumps) through which the pipeline 4 passes.

FIGS. 6, 7, 8 and 9 shown embodiments of the present invention which are adapted to allow a degree of misalignment of the pipe as it enters through the chamber wall. The inside surface of the sleeve 72 is chamfered out towards the outer surfaces of the fitting. That is to say, the internal diameter of the sleeve is smallest at its central point, or thereabouts, and the inner diameter of the sleeve increases as one traverses the longitudinal axis of the fitting, in either direction. In practice, it is as if the fitting was constructed from two shallow frustoconical portions welded together, narrower point to narrower point. The substantially narrowest point is at 74.

Figure 10:
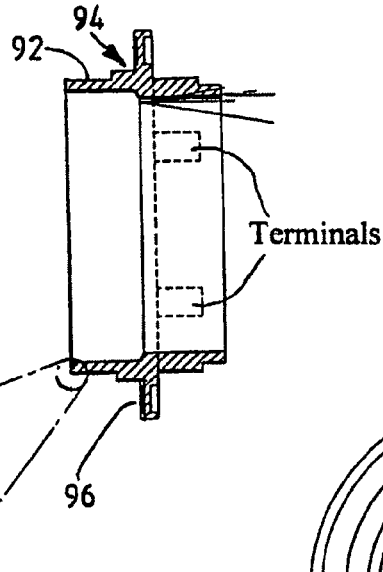
Figure 12:
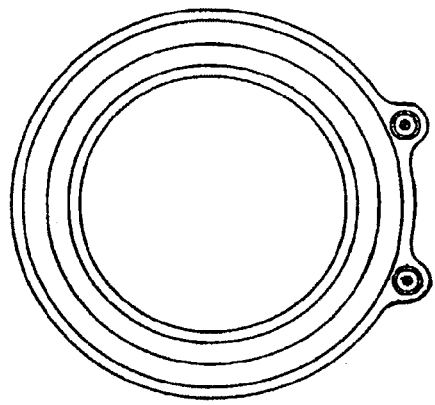
Figure 11:
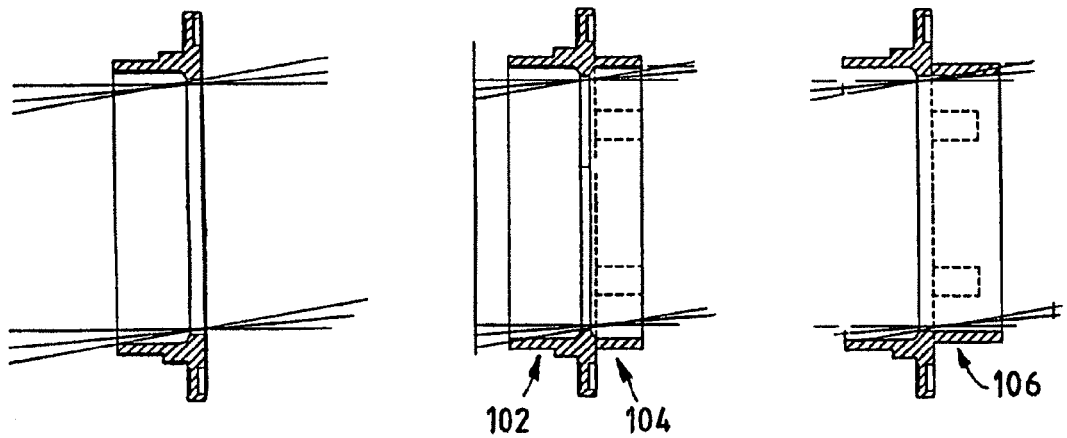
Figure 16:
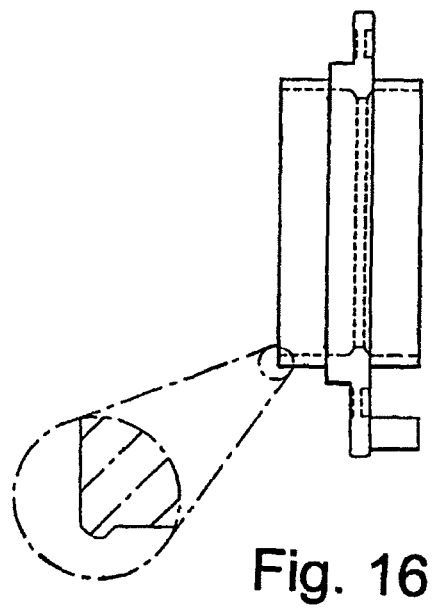
FIGS. 16 to 22 show various other configurations of fittings.
Figure 17:
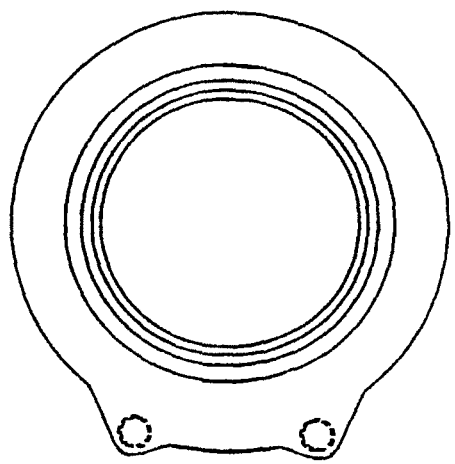
Figure 18:
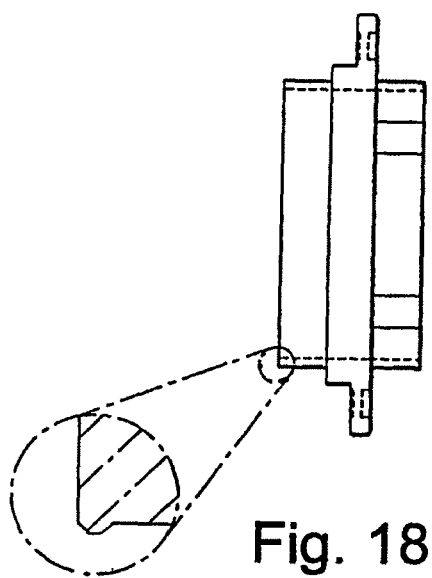
Figure 19:
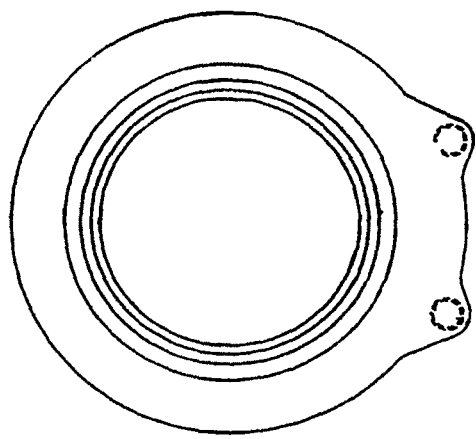
Figure 20:
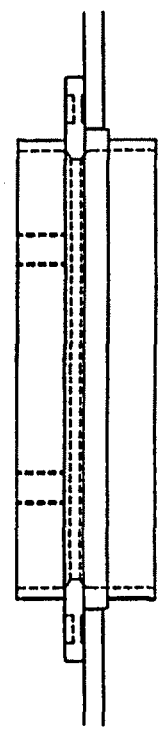
Figure 21:
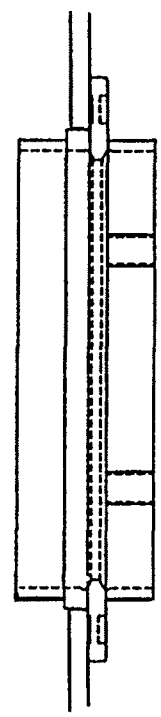
Figure 22:
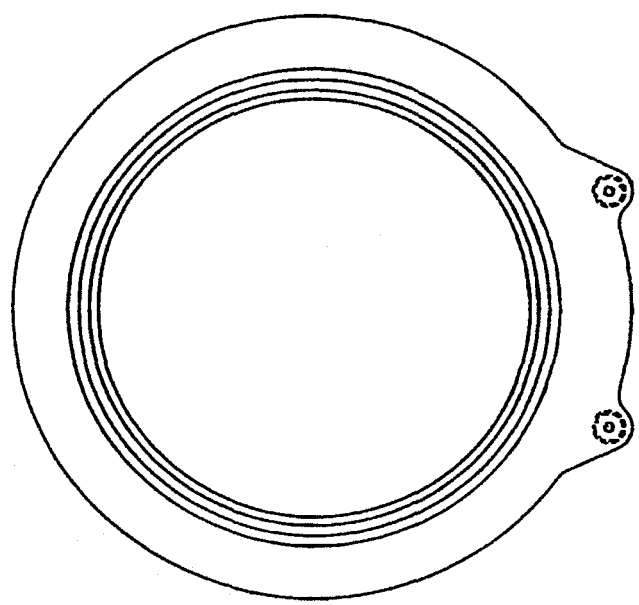

The flexibility of this arrangement is shown in FIGS. 10, 11 and 12. In these cases provision for a 10° misalignment either side of perpendicular is provided for. However, by careful design this angle can be increased as desires.

Enlargements in FIGS. 6 and 8 show how provision can be made to secure a rubber boot in place over the inner part of the sleeves 76 and 86 which extend into the chamber. A protrusion or enlarged lip 80, 90 extends around the external circumference of the sleeve. This enables a rubber boot to be clamped securely around the sleeve as required.

Important features of the invention are shown in FIGS. 10, 11 and 12. These illustrate how it is possible to extend the sleeve from both sides of the chamber wall for maximum flexibility and also to allow for attachment of the fitting inside as well as outside the chamber. These designs share many common features. Referring to FIG. 10, this illustrates a sleeve 92 which extends in use both inside and outside the chamber wall. The chamber wall is not shown in this Figure but would locate generally at 94 and but up to the flange 96.

The surface of flange 96 has embedded into it a heating element. The shape and dimensions of the sleeve can be adjusted such that it only extends into the chamber. This is shown as Option 1 in FIG. 11. Alternatively, a degree of symmetry about the flange can be provided such that the boot can be welded either on the inside or the outside of the chamber wall. This is shown in Option 2 of FIG. 11. In this case a substantially similar portion of sleeve 102, 104 suitable for attachment to a rubber boot, extends on either side of the flange.

It is also possible to adapt these fixings for use with conventional electrofusion pipe welding sockets. An example of this is illustrated in FIG. 11 Option 3. In this case a portion of the sleeve 106 extends outwards from the chamber wall in use to act as a termination for a secondary containment pipe. A suitable termination is a Wavi Duo PN4 socket from Petro-Technik Ltd.

The fitting of Option 3 will allow for some misalignment of the pipe. However, when secondary containment is used there should be no misalignment of the primary pipe.

This is just one way of terminating any secondary containment system. It is equally possible to use the types of termination shown in FIGS. 13, 14 and 15 which illustrate different arrangements for different pipe diameters. Pipe jointing components of a type known per se, can be used to couple and/or terminate secondary pipes. This greatly increases the flexibility of this type of fitting.

Perspective views of a fitting according to the present invention are shown in FIGS. 23 and 24. These illustrate a flange 130 extending radially outwardly from a sleeve 132. The sleeve extends on both sides of the flange. A raised rim 134 extends around the outer circumference of each end of the sleeve. Electrical terminals 136 and 138 allow current to be connected to a heating wire embedded in the surface of the flange adapted to engage with the chamber wall.

Fittings according to the present invention can be formed from any suitable material as selected by the materials specialist. Preferably the fittings are formed from a thermoplastic material such as polyethylene. In a particularly preferred embodiment they are formed as a single unit by turning or casting.

Methods of laying a wire into a flat surface are known, for example by Rutland Plastics Ltd, and can be applied here without substantial modification.

The present invention also encompasses a method of fixing a pipe to a chamber wall as described above and the combination of apparatus that results from operating said method.

The invention claimed is:

1. A subterranean fuel storage tank assembly for use in a petroleum forecourt installation used in the petroleum industry, comprising:
   a subterranean fuel storage tank;
   a chamber with a generally planar chamber wall having opposite sides and a fuel conveying pipework system in fluid communication with the fuel storage tank including at least one pipe extending into the chamber through an opening in the chamber wall; and
   a rigid fitting for providing a substantially fluid-tight seal between the opening in the chamber wall and a pipe of the pipework system passing through said opening to seal against water from leaking into the chamber to seek to maintain the chamber substantially free of water, comprising:
   (i) a tubular sleeve for attachment to said pipe;
   (ii) a flange having opposite sides and extending radially outwardly from the sleeve and positioned relative thereto so that the tubular sleeve extends from at least one side of said flange; and
   (iii) an energy transfer means comprising conduction means for conducting an electric current, said conduction means in use being heated by the current, to cause a heating of the rigid fitting, said energy transfer means being situated adjacent to a surface of the rigid fitting and being adapted to heat the surface of the rigid fitting in order to form a substantially fluid tight seal between said chamber wall and the rigid fitting by causing the wall and the rigid fitting to bond together.

2. A subterranean fuel storage tank assembly according to claim 1, further comprising a sealing member for sealing the sleeve to the pipe.

3. A subterranean fuel storage tank assembly according to claim 2, wherein the sealing member is incorporated into the sleeve.

4. A subterranean fuel storage tank assembly according to claim 2, wherein the sealing member comprises an electrofusion seal.

5. A subterranean fuel storage tank assembly according to claim 2, wherein the sealing member is resilient and there is provided clamping means for clamping the sealing member to one of the pipe, the sleeve, and both the pipe and the sleeve.

6. A subterranean fuel storage tank assembly according to claim 1, in which the surface of said fitting comprises a fusible material which, when heated via the energy transfer means, at least partially melts, causing the fitting and the wall to be fused together.

7. A subterranean fuel storage tank assembly according to claim 1, in which the fitting is adapted for use with a wall which is of a material which is not suitable for being attached to the fitting by electrofusion, the surface of the fitting incorporating an adhesive of a type which is activated by heat, wherein the heating of the surface by the energy transfer means activates the adhesive and thereby bonds the fitting to the wall.

8. A subterranean fuel storage tank assembly according to claim 7, in which the adhesive is an adhesive selected from the group consisting of a thermoplastic, thermoset and cross-linking adhesive.

9. A subterranean fuel storage tank assembly according to claim 1, in which the energy transfer means of said fitting comprises a heating wire which is embedded within the surface.

10. A subterranean fuel storage tank assembly according to claim 1, in which the sleeve of said fitting is of a substantially circular cross-section.

11. A subterranean fuel storage tank assembly according to claim 1, in which the fitting includes terminals for connecting the energy transfer means to a current supply.

12. A fuel assembly, comprising:
a fuel pump in fluid communication with a fuel storage tank;
a chamber associated with the fuel assembly, the chamber having a generally planar subterranean chamber wall having opposite sides and having a pipe extending into the chamber through an opening in the chamber wall; and
a rigid fitting in the chamber wall for providing a substantially fluid-tight seal between the opening in the subterranean chamber wall and the pipe passing through said opening to seal against water from leaking into the chamber to seek to maintain the chamber substantially free of water, comprising:
(i) a tubular sleeve for attachment to said pipe;
(ii) a flange having opposite sides and extending radially outwardly from the sleeve and positioned relative thereto so that the tubular sleeve extends from at least one side of said flange, and one of said sides of said flange having a generally planar first surface configured and positioned to directly contact one side of the chamber wall around substantially the whole circumference of the opening; and
(iii) an energy transfer means comprising conduction means for conducting an electric current, said conduction means in use being heated by the current, to cause said heating of the first surface of said flange, said energy transfer means being situated adjacent to the first surface of the flange and being adapted to heat the first surface of the flange in order to form a substantially fluid tight seal between one side of said chamber wall and the flange by causing the wall and the flange to bond together.

13. A fuel assembly according to claim 12, further comprising a sealing member for sealing the sleeve to the pipe.

14. A fuel assembly according to claim 13, wherein the sealing member is incorporated into the sleeve.

15. A fuel assembly according to claim 13, wherein the sealing member comprises an electrofusion seal.

16. A fuel assembly according to claim 13, wherein the sealing member is resilient, and there is provided clamping means for clamping the sealing member to one of the pipe, the sleeve, and both the pipe and the sleeve.

17. A fuel assembly according to claim 12, in which the first surface of said fitting comprises a fusible material which, when heated via the energy transfer means, at least partially melts, causing the fitting and the wall to be fused together.

18. A fuel assembly according to claim 12, in which the fitting is adapted for use with a wall which is of a material which is not suitable for being attached to the fitting by electrofusion, the first surface of the fitting incorporating an adhesive of a type which is activated by heat, wherein the heating of the first surface by the energy transfer means activates the adhesive and thereby bonds the fitting to the wall.

19. A fuel assembly according to claim 18, in which the adhesive is a member selected from the group consisting of a thermoplastic, thermoset and cross-linking adhesive.

20. A fuel assembly according to claim 12, in which the energy transfer means of said fitting comprises a heating wire which is embedded within the first surface.

21. A fuel assembly according to claim 12, in which the fitting includes terminals for connecting the energy transfer means to a current supply.

22. A subterranean fuel storage tank assembly according to claim 1, wherein said tubular sleeve is further adapted to pass through the opening in the chamber wall and wherein the tubular sleeve extends from both sides of the flange such that, in use, the fitting can be positioned in one position on the inside of the chamber wall and in a reversed, alternative position, on the outside of the chamber wall.

23. A fuel assembly according to claim 12, wherein said tubular sleeve is further adapted to pass through the opening in the chamber wall and wherein the tubular sleeve extends from both sides of the flange such that, in use, the fitting can be positioned in one position on the inside of the chamber wall and in a reversed, alternative position, on the outside of the chamber wall.

24. The fuel assembly of claim 12, further comprising a dispensing pump, and wherein the pipe comprises a pipe of a fuel conveying pipework system.

25. The subterranean fuel storage tank assembly according to claim 1, wherein said energy transfer means are situated adjacent to a first surface of the flange and adapted to heat the first surface of the flange in order to form the substantially fluid tight seal between the chamber wall and the flange by causing the wall and the flange to bond together.

26. A fuel assembly, comprising:
a fuel pump in fluid communication with a fuel storage tank;
a chamber associated with the fuel assembly, the chamber having a generally planar subterranean chamber wall having opposite sides and having a pipe extending into the chamber through an opening in the chamber wall; and
a rigid fitting in the chamber wall for providing a substantially fluid-tight seal between the opening in the subterranean chamber wall and the pipe passing through said opening to seal against water from leaking into the chamber to seek to maintain the chamber substantially free of water, comprising:
(i) a tubular sleeve for attachment to said pipe;
(ii) a flange having opposite sides and extending radially outwardly from the sleeve and positioned relative thereto so that the tubular sleeve extends from at least one side of said flange; and
(iii) an energy transfer means comprising conduction means for conducting an electric current, said conduction means in use being heated by the current, to cause said heating of the rigid fitting, said energy transfer means being situated adjacent to a surface of the rigid fitting and being adapted to heat the surface of the rigid fitting in order to form a substantially fluid tight seal between said chamber wall and the rigid fitting by causing the wall and the rigid fitting to bond together.

27. A fuel assembly according to claim 26, further comprising a sealing member for sealing the sleeve to the pipe.

28. A fuel assembly according to claim 27, wherein the sealing member is incorporated into the sleeve.

29. A fuel assembly according to claim 27, wherein the sealing member comprises an electrofusion seal.

30. A fuel assembly according to claim 27, wherein the sealing member is resilient, and there is provided clamping means for clamping the sealing member to one of the pipe, the sleeve, and both the pipe and the sleeve.

31. A fuel assembly according to claim 26, in which the surface of said fitting comprises a fusible material which, when heated via the energy transfer means, at least partially melts, causing the fitting and the wall to be fused together.

32. A fuel assembly according to claim 26, in which the fitting is adapted for use with a wall which is of a material which is not suitable for being attached to the fitting by electrofusion, the surface of the fitting incorporating an adhesive of a type which is activated by heat, wherein the heating of the surface by the energy transfer means activates the adhesive and thereby bonds the fitting to the wall.

33. A fuel assembly according to claim 32, in which the adhesive is a member selected from the group consisting of a thermoplastic, thermoset and cross-linking adhesive.

34. A fuel assembly according to claim 26, in which the energy transfer means of said fitting comprises a heating wire which is embedded within the surface.

35. A fuel assembly according to claim 26, in which the fitting includes terminals for connecting the energy transfer means to a current supply.

36. A fuel assembly according to claim 26, wherein said tubular sleeve is further adapted to pass through the opening in the chamber wall and wherein the tubular sleeve extends from both sides of the flange such that, in use, the fitting can be positioned in one position on the inside of the chamber wall and in a reversed, alternative position, on the outside of the chamber wall.

37. The fuel assembly of claim 26, further comprising a dispensing pump, and wherein the pipe comprises a pipe of a fuel conveying pipework system.

\* \* \* \* \*